Sept. 21, 1971     J. C. F. GIRODAT     3,606,745

GRAIN FLOW RATE MONITOR

Filed Sept. 8, 1969

INVENTOR.
JOSEPH C. F. GIRODAT
BY

*Gerhardt, Greenlee & Farris*

ATTORNEYS.

United States Patent Office 3,606,745
Patented Sept. 21, 1971

3,606,745
GRAIN FLOW RATE MONITOR
Joseph C. F. Girodat, Brampton, Ontario, Canada, assignor to Massey-Ferguson Industries Limited, Toronto, Ontario, Canada
Filed Sept. 8, 1969, Ser. No. 855,909
Int. Cl. A01d *41/02*
U.S. Cl. 56—20                            7 Claims

ABSTRACT OF THE DISCLOSURE

A combine harvester is provided with a circuit for detecting the flow rate of grain at any particular point in the combine. This circuit includes a high frequency piezoelectric transducer located at a convenient point in the path of flow of the grain. As grain and other crop materials impinge, the transducer develops voltage spikes, a particular frequency range of which is detected by a frequency detecting circuit which amplifies the detected spikes. Next the signal is fed to an amplitude detecting circuit to detect a range of amplitudes of voltage spikes above a predetermined amplitude which includes spikes produced by grain impingement on the transducer, but excludes the spikes produced by other threshed crop material. The detected voltage spikes are then converted by a monostable multivibrator into square wave form and sent to a meter circuit where they are average and visually displayed on a meter. In this manner the combine operator can instantaneously know the flow rate of grain at any specified point in the combine and can determine from this flow whether the combine is operating efficiently.

---

Figure 1:
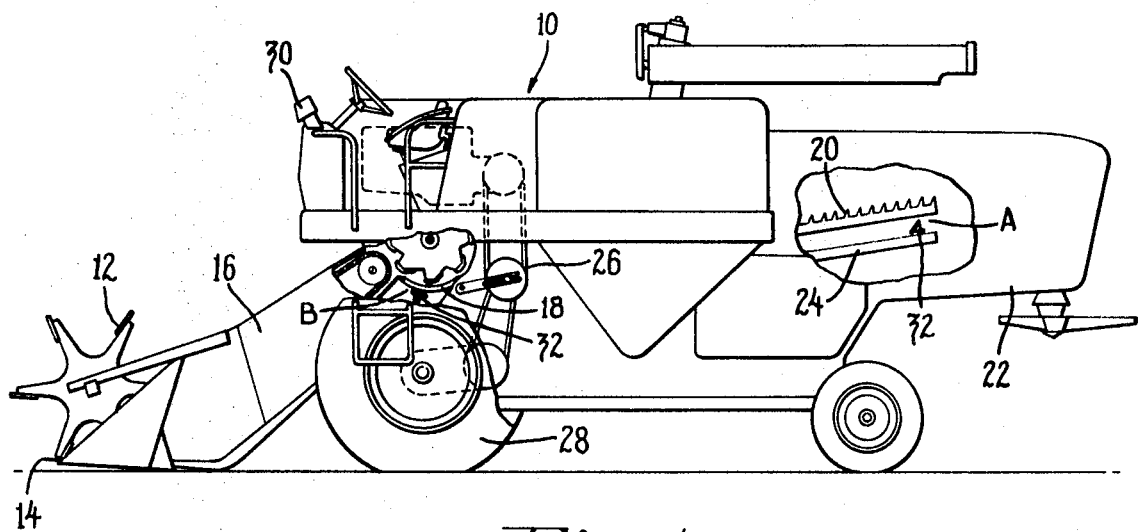

This invention relates generally to combine harvesters and more particularly to a device for monitoring the grain flow rate at a particular point in the combine.

A combine harvester used to harvest grain is capable of a variety of different ground speeds so that different crop conditions may be accommodated. Conditions which vary are moisture content, quantity of grain and straw per acre, height of the crop, and quality of the grain. All of these factors affect the harvesting of the crop.

Every combine has an ideal operating speed for any particular crop conditions. This speed is determined by the feed rate, conveyor rate, concave width and straw walker design. At one particular ground speed, the combine recovers the highest percentage of grain at those particular crop conditions. This speed is normally determined by an operator who has had vast experience, can visually judge the crop conditions, and knows his machine. Since the crop conditions can vary widely in the same field and from field to field, it is necessary for the operator to constantly vary the speed of his machine.

Because of inattention, inexperience, or misjudgment, response is often not proper and the combine does not operate at the most efficient speed.

Devices for measuring the flow rate of grain lost out the rear end of combines have been proposed to provide the combine operator with an accurate indication of grain loss rate which shows the level of machine efficiency. However, these devices have suffered from the inability to distinguish grain from other threshed crop materials.

It is therefore an object of this invention to provide a device for measuring the flow rate of grain in a combine which accurately distinguishes grain from other threshed crop material.

In accordance with this invention, a combine harvester for threshing crop material to recover grain features a grain flow rate measuring circuit apparatus for determining the flow rate of grain at a point in the combine, comprising an electrical transducer mounted in the flow path of grain responsive to impingement of grain and other threshed crop material thereon to develop voltage spikes, a frequency detecting circuit connected to the transducer for detecting a predetermined frequency range of voltage spikes developed by the transducer, the frequency range including voltage spikes developed from grain impingement, an amplitude detecting circuit connected to the frequency detector circuit for detecting a range of amplitudes of voltage spikes above a predetermined amplitude, the range of amplitudes including voltage spikes developed from grain impingement, a pulse generating circuit connected to the amplitude detecting circuit and responsive to the detected voltage spikes to generate square wave pulses, and a measuring circuit connected to the pulse generating circuit and responsive to the square wave pulses to measure the grain flow rate.

Figure 2:
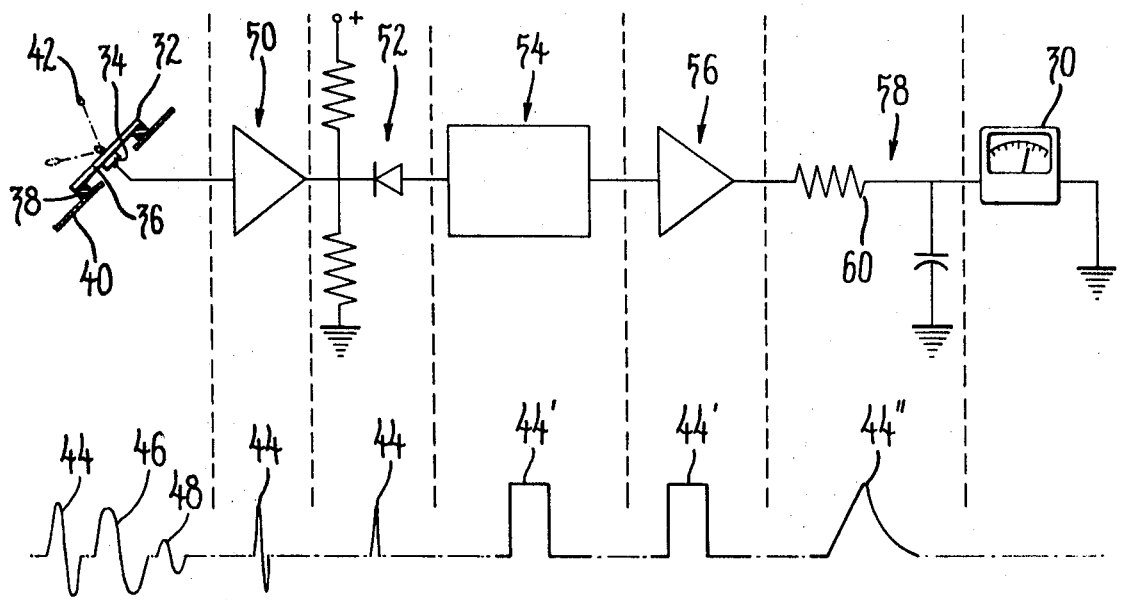

These and further objects and features of this invention will become more readily apparent upon reference to the following detailed description of a preferred embodiment as shown in the annexed drawings, wherein:

FIG. 1 is a partially broken away side elevation of a combine harvester showing the location of the grain flow rate measuring apparatus according to this invention; and FIG. 2 is a schematic circuit diagram including a voltage diagram which illustrates the electrical circuitry of the grain flow rate measuring apparatus according to this invention.

Referring now to FIG. 1 of the drawings, a conventional combine harvester 10 is provided with a reel 12 and a cutter 14 for cutting crop material and an elevator 16 for conveying this crop material to the interior of the combine. In the combine the threshed crop material is fed into a cylinder and concave 18 where some of the grain is separated. The threshed crop material is then fed through the straw walkers 20 which agitate the crop material to further separate out grain and collect it in pan 24. The threshed crop material is then conveyed out the rear end 22 of the combine. A variable speed drive arrangement 26 is provided for driving the front drive wheels 28 of the combine at a variable rate of speed in accordance with the crop conditions.

To enable the operator a much better indication of the operating efficiency of the combine other than by visual inspection of grain loss out the rear 22 of the combine or visual identification of crop conditions, an electrical detecting circuit is provided on the combine. This circuit includes a meter 30 which indicates the amount of grain flow at a particular point of the combine such as at (A) beneath the end of the straw walkers or (B) beneath the concave. At either or both of these locations an electrical transducer 32 can be placed in the flow path of grain separated at the straw walkers or at the concave.

Referring now to FIG. 2 of the drawings, the transducer 32 comprises a piezoelectric ceramic disc 34 which is mounted at the center of a circular aluminum disc 36 that is then mounted through rubber gaskets 38 to a support 40 in the combine.

As a kernel of grain 42 impinges on the ceramic disc 34, a voltage spike 44 is developed. As other crop material simultaneously impinges on the disc 34, other voltage spikes 46, 48 of different frequency and amplitude are developed in the transducer 32.

Connected to the transducer to receive these voltage spikes is a frequency detecting circuit 50, preferably in the form of a band pass filter, which detects and passes on only those voltage spikes having a frequency which lies above a certain value or in a certain band of frequencies. This circuit also includes means for amplifying the voltage spike 44 as shown.

Next the voltage spike 44 is fed to an amplitude detecting circuit 52 to filter out all voltage spikes having an amplitude less than a predetermined amount so that the voltage spikes caused by grain impingement on the transducer 32 are the only voltage spikes remaining. Next the voltage spike 44 is fed into a monostable multivibrator 54 which generates a square wave impulse 44' which is then fed to an amplifier 56 which amplifies the square wave 44'.

The amplified square wave is fed into a metering circuit 58 which includes an averaging circuit 60 which produces an average voltage 44'' which drives a conventional meter 30 to provide a visual indication of grain flow rate.

Thus the circuit according to this invention distinguishes the impingement of grain on a transducer from the impingement of other crop material such as nodes, straw, etc. The signals are detected, amplified and averaged so that they may be readily read on a visual indicator, which would be calibrated in a flow rate, such as kernels per second or bushels per minute. By placing the transducer 32 at location (A) beneath the ends of the straw walkers, the rate of grain flow at a point adjacent the flow path of grain lost out the end of the combine can be accurately counted. However, there is a time lapse between the time the grain is severed by the knife 14 and the time it is ejected from the rear of the combine. Thus meter 30 would indicate too late that speed corrections should have been made. It has been found that three seconds of the time lapse can be regained by placing the transducer 32 in location (B) beneath the concave. Here the flow rate of the grain can be detected at its earliest possible moment so that correction by the combine operator can be effected as soon as possible. Of course, the optimum flow rate for different crops would have to be determined in advance to give the operator a set of standards with which to compare the flow rate.

I claim:

1. In a combine harvester for threshing crop material to recover grain from the crop material, grain flow rate measuring circuit apparatus for determining the flow rate of grain at a point in the combine, comprising: an electrical transducer mounted in the flow path of grain and responsive to the impingement of grain and other threshed crop material thereon to develop voltage spikes, a frequency detecting circuit connected to the transducer for detecting a predetermined frequency range of voltage spikes developed by the transducer, the frequency range including voltage spikes developed from grain impingement, an amplitude detecting circuit connected to the frequency detector circuit for detecting a range of amplitudes of voltage spikes above a predetermined amplitude, the range of amplitudes including voltage spikes developed from grain impingement, a pulse generating circuit connected to the amplitude detecting circuit and responsive to the detected voltage spikes to generate square wave pulses, and a measuring circuit connected to the pulse generating circuit, responsive to the square wave pulses to measure the grain flow rate, and wherein the frequency and amplitude detecting circuits are operable to filter out all voltage spikes developed from threshed crop impinging on the transducer except those developed from grain impinging on the transducer.

2. In a combine harvester for threshing crop material to recover grain from the crop material, grain flow rate measuring circuit apparatus for determining the flow rate of grain at a point in the combine, comprising: an electrical transducer mounted in the flow path of grain and responsive to the impingement of grain and other threshed crop material thereon to develop voltage spikes, a frequency detecting circuit connected to the transducer for detecting a predetermined frequency range of voltage spikes developed by the transducer, the frequency range including voltage spikes developed from grain impingement, an amplitude detecting circuit connected to the frequency detector circuit for detecting a range of amplitudes of voltage spikes above a predetermined amplitude, the range of amplitudes including voltage spikes developed from grain impingement, a pulse generating circuit connected to the amplitude detecting circuit and responsive to the detected voltage spikes to generate square wave pulses, and a measuring circuit connected to the pulse generating circuit, responsive to the square wave pulses to measure the grain flow rate, and wherein the frequency detecting circuit includes a band pass filter for detecting a predetermined frequency band of voltage spikes including those developed from grain impingement.

3. The apparatus of claim 2, wherein the frequency detecting circuit includes means for amplifying the voltage spikes.

4. In a combine harvester for threshing crop material to recover grain from the crop material, grain flow rate measuring circuit apparatus for determining the flow rate of grain at a point in the combine, comprising: an electrical transducer mounted in the flow path of grain and responsive to the impingement of grain and other threshed crop material thereon to develop voltage spikes, a frequency detecting circuit connected to the transducer for detecting a predetermined frequency range of voltage spikes developed by the transducer, the frequency range including voltage spikes developed from grain impingement, an amplitude detecting circuit connected to the frequency detector circuit for detecting a range of amplitudes of voltage spikes above a predetermined amplitude, the range of amplitudes including voltage spikes developed from grain impingement, a pulse generating circuit connected to the amplitude detecting circuit and responsive to the detected voltage spikes to generate square wave pulses, and a measuring circuit connected to the pulse generating circuit, and responsive to the square wave pulses to measure the grain flow rate and including means for amplifying the square wave pulses and an averaging circuit for producing an averaged voltage from the square wave pulses.

5. The apparatus of claim 4, wherein the measuring circuit includes a meter responsive to the averaged voltage to indicate the grain flow rate.

6. In a combine harvester for threshing crop material to recover grain from the crop material, grain flow rate measuring circuit apparatus for determining the flow rate of grain at a point in the combine, comprising: an electrical transducer mounted in the flow path of grain and responsive to the impingement of grain and other threshed crop material thereon to develop voltage spikes, a frequency detecting circuit connected to the transducer for detecting a predetermined frequency range of voltage spikes developed by the transducer, the frequency range including voltage spikes developed from grain impingement, an amplitude detecting circuit connected to the frequency detector circuit for detecting a range of amplitudes of voltage spikes above a predetermined amplitude, the range of amplitudes including voltage spikes developed from grain impingement, a pulse generating circuit connected to the amplitude detecting circuit and responsive to the detected voltage spikes to generate square wave pulses, and a measuring circuit connected to the pulse generating circuit, responsive to the square wave pulses to measure the grain flow rate, and wherein the pulse generating circuit includes a monostable multivibrator for generating the square wave pulses.

7. In a combine harvester for threshing crop material to recover grain from the crop material and including straw walkers, grain flow rate measuring circuit apparatus for determining the rate of grain recovered from the threshed crop at the end of the combine straw walkers comprising: an electrical transducer mounted beneath the ends of the straw walkers and responsive to the impingement of grain and other threshed crop material thereon to develop voltage spikes, a frequency detecting circuit connected to the transducer for detecting a predetermined frequency band of voltage spikes developed by the transducer, the frequency range including voltage spikes developed from grain impingement, an amplitude detecting circuit connected to the frequency detector circuit for detecting a range of amplitudes of voltage spikes above a predetermined amplitude, the range of amplitudes including voltage spikes developed from grain impingement but excluding spikes developed from impingement of other threshed crop material, a pulse generating circuit connected to the amplitude detecting circuit and responsive to the detected voltage spikes to generate square wave pulses, and a measuring circuit including a visible display device connected to the pulse generating circuit and responsive to the square wave pulses to indicate the flow rate of grain recovered at the end of the straw walkers.

References Cited

UNITED STATES PATENTS

| | | | |
|---|---|---|---|
| 3,442,068 | 5/1969 | Bulin | 56—20 |
| 3,515,144 | 6/1970 | Morrison | 130—26 |

FOREIGN PATENTS

| | | | |
|---|---|---|---|
| 234,307 | 6/1961 | Australia | 56—Dig. 15 |
| 53,446 | 1/1967 | Germany | 56—Dig. 15 |

ANTONIO F. GUIDA, Primary Examiner

U.S. Cl. X.R.

56—Dig. 15; 130—27J; 209—1